United States Patent

[11] 3,601,052

| [72] | Inventor | John C. Mollere<br>San Marino, Calif. |
| [21] | Appl. No. | 832,727 |
| [22] | Filed | June 12, 1969 |
| [45] | Patented | Aug. 24, 1971 |
| [73] | Assignee | Western Geophysical Company of America<br>Houston, Tex. |

[54] UNDERWATER CHARGE LAUNCHER
4 Claims, 5 Drawing Figs.

| [52] | U.S. Cl. | 102/22,<br>181/.5 X |
| [51] | Int. Cl. | F42d 3/06 |
| [50] | Field of Search | 181/.5 X,<br>.5; 102/22, 23, 24 |

[56] References Cited
UNITED STATES PATENTS
3,360,070  12/1967  Cholet et al. ............... 102/24 X
3,509,820  5/1970  Fitch et al. ............... 102/24

*Primary Examiner*—Samuel W. Engle
*Attorneys*—Michael P. Breston, Alan C. Rose and Alfred B. Levine ABSTRACT: This invention relates to an underwater charge launcher for consecutively firing percussion-initiated, explosively operated charges under a body of water to generate therein seismic waves useful in seismic prospecting operations. The launcher includes a casing adapted to receive water-propelled charges and a percussion member which while arresting the motion of the charge also percussion initiates the blasting cap of the charge. A lateral window for ejecting the percussion-initiated charges from the casing, and at least one cavity in the casing opposite the window to develop a relatively high-pressure zone for facilitating the ejection of the charge through the window.

Patented Aug. 24, 1971
3,601,052
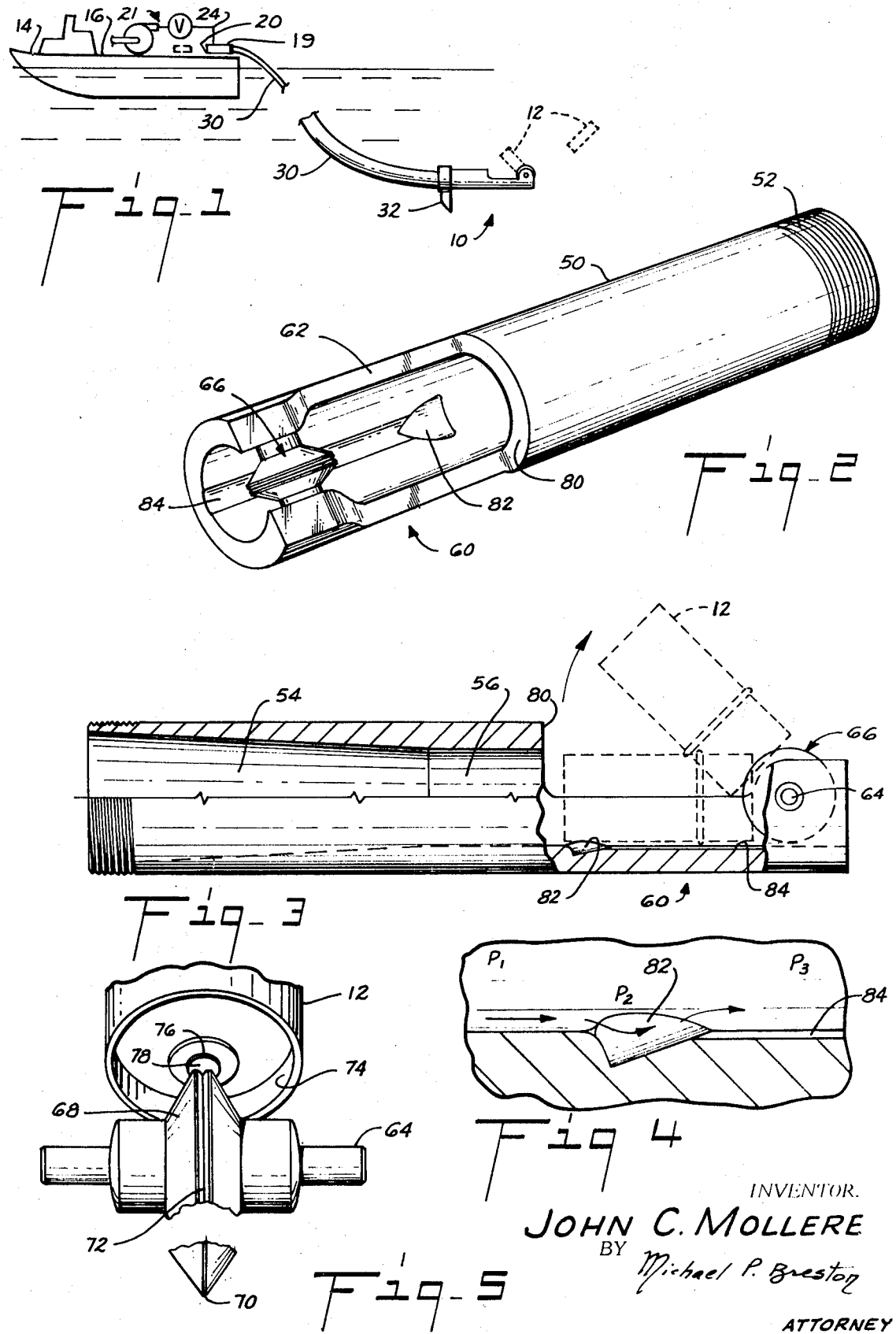
INVENTOR.
JOHN C. MOLLERE
BY Michael P. Breston
ATTORNEY

UNDERWATER CHARGE LAUNCHER

BACKGROUND OF THE INVENTION

Recently, in the seismic industry an improved seismic energy source has been proposed for generating seismic disturbances in a body of water with the aid of percussion-initiated, small, explosive-operated charges which are discharged into the water at relatively short-cycle times thereby avoiding the necessity for using relatively large explosive-operated charges which have become objectionable in most offshore operations.

In a preferred embodiment of such an energy source there is provided a charge launcher having a casing adapted to receive water-propelled charges. The casing defines a lateral ejection window at the end of which is positioned a percussion element for initiating the charge prior to it being expelled from the casing through the window into the body of water. The launcher is towable through the water at a predetermined depth for rapidly and sequentially receiving, initiating and ejecting these small seismic charges outside of the launcher casing for detonation. A flexible conduit made for example from a resilient material such as a fiber-reinforced rubber or other suitable plastic tubing is used to convey the charges from a loader on the deck of a seismic boat into the casing of the launcher with the aid of fluid under pressure typically water pressure.

While the known charge launcher is reasonably effective for accomplishing its intended purposes, it was found that occasionally an initiated charge will fail to become ejected through the lateral window of the casing. Of course, if the charge should explode in the casing rather than in the water outside the casing, the launcher becomes partially or totally destroyed.

SUMMARY OF THE INVENTION

In accordance with this invention there is provided an underwater charge launcher adapted to receive water-propelled, percussion-initiatable, explosively operated charges. The casing defines at its end an ejection window positioned close to a percussion element which arrests the arriving waterpropelled charges in front of the ejection window while at the same time initiating the blasting cap on the charge. Ejection means in the wall of the casing opposite the window are provided to develop, in response to the arriving water pressure, a relatively high-pressure zone which assists in the ejection process of the charge from the casing through the ejection window.

BRIEF DESCRIPTION OF THE DRAWINGS

FIG. 1 shows schematically a seismic boat towing a known charge launcher system;

FIG. 2 is a view in perspective of the charge launcher of this invention for use in the system of Figure 1;

FIG. 3 is a view in cross section of the launcher shown in Figure 2, also shown is the path followed by the charge while being ejected from the launcher;

FIG. 4 illustrates the pressures developed near the high-pressure zone in Figure 2; and FIG. 5 shows in perspective partial views of two percussion elements useful to initiate the charges in the launcher shown in FIG. 2.

Referring to Figure 1, there is shown a system for generating seismic waves in a body of water by consecutively firing percussion-initiatable, explosively operated small charges. The firing system itself is described in U.S. Pat. No. 3,509,820 and forms no part of this invention, however, a brief description of the firing system will be given hereinafter. A charge launcher 10 is adapted to receive percussion initiatable, explosively operated charges 12. Each charge 12 includes delay means such as a delay fuse which causes its charge to detonate at a distance removed from the launcher 10. Launcher 10 is towed by a seismic boat 14 at a predetermined depth below the surface of the body of water. The directional stability of the launcher 10 is maintained by suitable paravanes 32.

On deck 16 of boat 14 are positioned a charge storage container not shown used to store a supply of charges 12, a cartridge loader generally designated as 19 having a hinged top closure 20 for receiving the charges from the storage container. A fluid actuator system 21 is used to initiate the movement of each charge. The fluid actuator system 21 is coupled to the charge loader 19 through a fluid line 24.

A flexible conduit 30, which may be a rubber reinforced tube, couples the charge loader 19 to the charge launcher 10. The conduit 30 allows the percussion-initiatable charges 12 to pass through conduit 30 under the propulsion of water pressure. The charges 12 are loaded into the loader 19 from the storage container through the hinged top 20. Conduit 30 extends from loader 19 to below the water surface and into the charge launcher 10 and is towed by boat 14.

Water is delivered from the water pump system 21 into the rear end of loader 19 at a sufficient pressure to cause each charge to move from loader 19 into conduit 30 for emplacement in the charge launcher 10.

By way of illustration of the operation of the known charge launcher thus far described and illustrated in Figure 1, the charge launcher 10 is towed beyond the seismic boat 14 at six to 10 knots per hour at a depth which may range from 10 to 50 feet below the water surface. An operator on deck 16 through suitable controls causes each charge 12 to become loaded into loader 19, closes the hinged door 20, and opens a valve in the actuator system 21 to allow water to flow through the delivery conduit 30, thereby moving the charge 12 under water pressure to the charge launcher 10. When charge 12 reaches the end of its trajectory its motion is arrested by a percussion element which strikes the firing pin in charge 12 thereby actuating the primer in the charge.

The charge is then ejected from the charge launcher 10 by the flow of water under pressure between the charge and the wall of the launcher.

The detonation of the ejected charge 12 is delayed by a time delay fuse until a distance of say seven to 10 feet is established between the initiated charge and the moving charge launcher 10. The operator then moves the hydraulic fluid control valves to their original positions for repeating the previously described operating cycle.

It will be appreciated that the system so far described depends on consecutively and rapidly detonating relatively small, explosively operated charges and that in such a system the charge ejection means must be fool proof and reliable or else irreparable damage may be caused to the charge launcher.

Referring now to the remaining Figures, 2 through 5, there is shown a preferred charge launcher for use in the system shown in Figure 1. The charge launcher includes a casing generally designated as 50 which is threadedly coupled by thread 52 to the flexible conduit 30. Casing 50 is preferably made of heavy-gauge steel and to facilitate fabrication is made of a solid tube in which are milled a first tapered bore defining a charge accelerating chamber 54, and a longitudinally adjoining cylindrical bore 56. The end portion, generally designated as 60, of casing 50 has a cutaway lateral ejection window 62. Mounted in the wall of end portion 60 is a shaft 64 rotatably supporting a percussion member or element 66. The percussion member 66 in the preferred embodiment is a disc 68 having either a V-cross section 70, or a W-cross section 72 as shown in Figure 5.

Charge 12 has a recessed end surface 74 from which extends inwardly into charge 12 a well 76 for receiving therein a firing pin 78 prior to the charge being propelled through loader 19. The interface between the window and the tubular portion of the casing 50 is denoted as 80.

In accordance with this invention there is provided in the casing 50 at least one cavity or recess 82 preferably opposite to the interface 80. An extension channel 84 leads from cavity 82 to the percussion element 66.

In operation as the charge moves from left to right, as seen in Figure 3, for example, due to the tapering of the inner bore 54, the charge 12 becomes accelerated while the driving water pressure gradually decreases. The reason for accelerating charge 12 through casing 50 is to ensure that charge 12 will hit the percussion element 66 with sufficient force for the charge to become initiated. The V-shaped percussion element 66, by being rotatably mounted on shaft 64 and having a reduced contact surface with pin 78 upon contact, exerts a great percussion force. The W-shaped element 66 could also be used to assure positive contact.

After the propelling water under pressure reaches the interface 80 it flows around the outer surface periphery of charge 12 and the portion of the inner wall of end stem 60. In particular, the water enters the cavity 82 and flows through the channel 84. By providing a sudden depression in the wall of casing 50 opposite to window 62, there is created a relatively high-pressure zone which tends to exert a lateral force against charge 12, after charge 12 has come to rest against percussion member 66. This lateral force propels the charge 12 outwardly of casing 50 for detonation in the water as previously described. As shown in FIG. 4, pressure $P_2$ in cavity 62 is greater than pressure $P_1$ in chamber 56 and is also greater than pressure $P_3$ in the channel 84. The dimensions of the cavity 32 are best selected experimentally. More than one cavity may be provided.

What I claim is:
1. A movable underwater charge launcher comprising:
    a casing for receiving initiatable, explosively operated charges,
    said charges being propelled through said casing by water pressure;
    a lateral port in the wall of said casing adjacent an open end of said casing for ejecting said charges from said casing into the surrounding water;
    a stop member mounted at the open end of said casing for engaging and bringing each moving charge through said casing to rest in front of said lateral port; and
    said wall of said casing having at least one longitudinal cavity therein opposite to said port to allow said water pressure in said cavity to assist in freeing said charge from said casing for lateral movement away from said stop member.
2. The underwater charge launcher of claim 1, wherein said stop member is a rotatably mounted wheel, and
    said charge becomes initiated upon engagement with said wheel.
3. The underwater charge launcher of claim 2 wherein said cavity further defines a flow channel to allow water to flow from said cavity to said stop member.
4. The underwater launcher of claim 2 wherein said casing defines an inner conical chamber to allow said charges to become accelerated through said casing prior to engaging said stop member.